United States Patent
Husmann

(10) Patent No.: US 11,447,365 B2
(45) Date of Patent: Sep. 20, 2022

(54) PARKING BRAKE

(71) Applicant: Inventio AG, Hergiswil (CH)

(72) Inventor: Josef Husmann, Lucerne (CH)

(73) Assignee: INVENTIO AG, Hergiswil NW (CH)

( * ) Notice: Subject to any disclaimer, the term of this patent is extended or adjusted under 35 U.S.C. 154(b) by 652 days.

(21) Appl. No.: 16/464,332

(22) PCT Filed: Dec. 13, 2017

(86) PCT No.: PCT/EP2017/082655
§ 371 (c)(1),
(2) Date: May 28, 2019

(87) PCT Pub. No.: WO2018/109020
PCT Pub. Date: Jun. 21, 2018

(65) Prior Publication Data
US 2021/0107767 A1   Apr. 15, 2021

(30) Foreign Application Priority Data

Dec. 16, 2016 (EP) .................................... 16204639

(51) Int. Cl.
*B66B 1/36* (2006.01)
*B66B 9/00* (2006.01)
(Continued)

(52) U.S. Cl.
CPC .................. *B66B 1/36* (2013.01); *B66B 9/00* (2013.01); *F16D 63/008* (2013.01);
(Continued)

(58) Field of Classification Search
CPC ......... B66B 1/36; B66B 5/18; F16D 2125/26; F16D 63/008; F16D 2055/0004;
(Continued)

(56) References Cited

U.S. PATENT DOCUMENTS 1,670,779 A   5/1928   Milks
2,326,046 A   8/1943   McCormick
(Continued)

FOREIGN PATENT DOCUMENTS

CN   104477725 A       4/2015
CN   204784311 U   *  11/2015
(Continued)

OTHER PUBLICATIONS

Machine Translation CN 204784311.*

*Primary Examiner* — Diem M Tran
(74) *Attorney, Agent, or Firm* — William J. Clemens; Shumaker, Loop & Kendrick, LLP

(57) ABSTRACT

A brake device for an elevator system generates a friction grip on an elevator rail and includes two legs with brake ends. The first leg is connected to a first articulation point of a transmission lever that has, located at a distance in a longitudinal direction from the first articulation point, a second articulation point that is connected to a first pivot of a pressure lever. The second leg is connected to a second pivot of the pressure lever. A third pivot of the pressure lever is connected to an articulation point of an actuating element (crank rod) whereby a longitudinal movement of the actuating element moves the brake device between a braking position with the brake ends spaced apart a minimum distance, and an opened position with the brake ends spaced apart a maximum distance. The actuating element longitudinal movement is predefined by first and second end points.

17 Claims, 6 Drawing Sheets

(51) Int. Cl.
  *F16D 63/00*    (2006.01)
  *F16D 65/097*   (2006.01)
  *F16D 121/24*   (2012.01)
  *F16D 125/26*   (2012.01)

(52) U.S. Cl.
  CPC ...... *F16D 65/0971* (2013.01); *F16D 2121/24* (2013.01); *F16D 2125/26* (2013.01)

(58) Field of Classification Search
  CPC ....... F16D 2055/0075; F16D 2055/224; F16D 2055/2245
  See application file for complete search history.

(56) References Cited

U.S. PATENT DOCUMENTS

| | | | | |
|---|---|---|---|---|
| 4,393,962 A | * | 7/1983 | Kobelt | ..................... B61H 5/00 |
| | | | | 188/59 |
| 2016/0355377 A1 | | 12/2016 | Husmann | |
| 2017/0080958 A1 | * | 3/2017 | Suzuki | ................ F16D 55/2255 |

FOREIGN PATENT DOCUMENTS

| | | | | |
|---|---|---|---|---|
| CN | 105358462 A | 2/2016 | | |
| CN | 105829229 A | 8/2016 | | |
| CN | 205739869 U | 11/2016 | | |
| WO | 2014154306 A1 | 10/2014 | | |
| WO | WO-2014154306 A1 | * 10/2014 | .............. | B66B 5/18 |
| WO | 2015090726 A1 | 6/2015 | | |

\* cited by examiner

PARKING BRAKE

FIELD

The invention relates to braking devices, an elevator system comprising a braking device and a method for stopping an elevator car at a stopping place.

BACKGROUND

A large number of braking devices on elevator systems are known from the prior art, which devices are used as safety brakes and lead to a braking effect in a situation in which no external force acts on the brake shoes, for example in a non-energized fall. These braking devices can be designed as wedge safety brakes, eccentric brakes or even as clasp brakes.

Braking devices in the form of damping brakes are also known, which are used to damp vibrations of the elevator car at a stopping place. In particular if the elevator car is being loaded or unloaded, the transfer of weight can lead to vertical movements of the car. Although these can be compensated for using minimal movements, this can produce a feeling of instability for the passenger. Moreover, the minimal movements cause higher wear and, as a result of the movement between the car and the shaft opening, cause a certain safety risk or corresponding monitoring functions.

Braking devices of this kind can correspondingly reduce vibrations and vertical movements while the elevator car is positioned at a stopping place, in particular at a shaft opening onto a floor.

Braking devices of this kind are generally not safety-related. They are used primarily for comfort during a car stop.

These braking devices or damping brakes typically have a mechanism for actuating and releasing the brakes. The brake shoes do not have to be preloaded because the braking device does not have to release automatically.

In order to achieve the brake effect, the braking device can be brought into a braking position in which a frictional connection on a guide rail of the elevator system leads to holding fast. Before the elevator car travels further, the frictional connection is released by a corresponding control command to the braking device. Braking devices of this kind are known from WO 2014/154306 or WO 2015/090726, for example. In this case, two centrally mounted brake arms are each moved by a common linear drive. The ends of each of the two brake arms are connected to a toggle lever, and this requires the braking device assembly to be a certain size.

A brake arrangement is known from the disclosure of U.S. Pat. No. 2,326,046, wherein two brake limbs are pressed against a brake rail by means of pressure and transmission levers via spring-loaded linkage when the linkage is correspondingly released. This braking device also requires a lot of space and is complex.

SUMMARY

The problem addressed by the invention is to prevent the known disadvantages and to provide a braking device, an elevator system comprising a braking device and a method for stopping an elevator car at a stopping place which allow simple operation and compact arrangement, and which braking device can preferably be used as a parking brake.

The problem addressed by the invention is solved by means of a braking device that comprises two limbs that have brake ends.

The first limb is hingedly connected to a first articulation point of at least one transmission lever. The transmission lever has a second articulation point that is spaced apart from the first articulation point in the longitudinal direction. This second articulation point is hingedly connected to a first pivot of at least one pressure lever.

The second limb is hingedly connected to a second pivot of the pressure lever. A third pivot of the pressure lever is hingedly connected to an articulation point of an actuating element, in particular a crank articulation point of a crank rod, such that, as a result of a longitudinal movement of the actuating element or the crank rod, the braking device can be moved from a braking position, in which the brake ends are at a minimum distance from one another, into an opened position, in which the brake ends are at a maximum distance from one another, and vice versa. In one solution, the longitudinal movement of the actuating element is in this case predetermined by a first end point and a second end point.

A tensile force in the actuating element or the crank rod is in this case converted into a compressive force of the brake ends. In one embodiment, a tensile force of 1 kN leads to a compressive force of approximately 4.5 kN. This compressive force is necessary for an elevator car that has a nominal load of 1250 kg and comprises two braking devices which together balance out 50% of the nominal load if a friction coefficient of 0.4 is taken as a basis. Using this design, the braking device is capable of absorbing a substantial part of a change in load which occurs during unloading and loading in the stopping place, without the elevator car moving. The braking device acts as a parking brake.

A planar lever arrangement of limbs, transmission levers, pressure levers and crank rod is preferably provided, in which arrangement all the rotational axes of the hinged connections are arranged in parallel.

The limbs, which can transfer the compressive force to a rail, are interconnected by the transmission lever and the pressure lever, the position of which levers determines the distance of the brake ends from one another. The arrangement therefore does not require levers of the same kind for each limb. This asymmetry allows the arrangement of the braking device to be compact. The pressure lever can be arranged such that the third pivot is not between the limbs. However, a particularly compact arrangement results when the third pivot is between the limbs.

The limbs can be mounted in a central pivot. In this case, the length from the bearing point to the brake end can be smaller from the length between the bearing point and articulation points, in order to achieve an optimal lever effect with respect to the compressive force. However, this leads to a relatively complex design. In a preferred embodiment of the braking device, the end region of each limb that is opposite the brake end is therefore hingedly connected to a braking device frame. The articulation points on the limbs are therefore between the brake ends and the connection to the braking device frame. This allows a compact design that has rather short limbs. The braking device can therefore be designed using little material and thus so as to be lightweight. The braking device that has to be moved together with the elevator car therefore only loads the energy balance of the elevator system to a small extent.

In one advantageous embodiment of the braking device, the crank articulation point of the crank rod or the articulation point of the actuating element is arranged between the limbs. A large part of the crank rod is preferably arranged between the limbs. The crank rod moves back and forth in the longitudinal direction substantially along the longitudinal orientation of the brake limbs. In so doing, the crank articulation point moves along a curve which is predefined by the pressure lever.

The pivots of the pressure lever and the articulation points of the transmission lever are advantageously arranged such that, in the braking position, the second pivot is substantially on a connecting line between the first and second articulation point of the transmission lever and, in the opened position, the pressure lever is rotated about the second pivot by an angle α of 90° with respect to the braking position. The crank rod is therefore substantially without force in the braking position, since the pressure lever and transmission lever are in the dead center or at least in the vicinity of a dead center.

The second pivot and the first articulation point, and therefore the brake ends of the brake limbs, are at a minimum possible distance when in the braking position.

The third pivot can be rotated by 90° about the second pivot by means of the crank rod, the crank rod covering the maximum possible path.

In one advantageous embodiment of the braking device, the articulation points are arranged on the limbs, the transmission lever and on the pressure lever such that the brake ends each cover at least one path of 7 mm between the braking position and the opened position.

In the opened position, which is usually assumed in the travel mode, the brake ends or brake parts arranged on the brake ends are at a sufficient distance from the rail that the braking device does not disturb the travel of the elevator car, even if the elevator car is subject to minor fluctuations during travel.

Brake pads and/or brake pad carriers can be arranged on the brake ends. The brake pad carriers can be resiliently mounted on the brake ends, in particular by means of preloaded spring elements. The compressive force that acts on the rail can be adjusted using the spring elements. Since a feed path of the brake ends is specified by a geometry of the participating levers, limbs and the associated connecting points, the final compressive force can be adjusted by selecting the spring elements. The spring elements can be pivotally mounted about a vertical axis in order to compensate for the braking device possibly not being precisely positioned with respect to the rail.

The spring elements can be resilient bodies, for example a PU (polyurethane) block similar to those used in stamping, which allow a large number of operational uses, in particular when quickly changing loads.

The braking device can have brake pads, in particular brake pads attached to brake pad carriers.

A soft material is preferably used for the brake pads, which material generates high friction even if there is oil on the rail. These can be plastics-based or rubber-based materials, or materials that have roughened or structured braking surfaces can be used.

In one preferred embodiment of the braking device, the braking device has two transmission levers arranged in parallel with one another and two pressure levers arranged in parallel with one another, one transmission lever and one pressure lever of which are in each case provided on one side of the limb and of the crank rod respectively.

The parallel design increases stability, reduces torsion of the braking device, in particular if a horizontal force acts on the braking device, and therefore ensures equal application of force through the two brake ends.

The crank rod can be moved by an actuator, for example by a linear motor.

The problem addressed by the invention is also solved by a braking device for an elevator system for generating a frictional connection on a rail of the elevator system, in particular a braking device as described above, comprising at least one limb having a brake end and an actuating element, it being possible, as a result of a longitudinal movement of the actuating element, to move the braking device from a braking position, in which the brake end is at a minimum distance from the rail, into an opened position, in which the brake end is at a maximum distance from the rail, and vice versa. The longitudinal movement of the actuating element is in this case predetermined by a first and a second end point. In a preferred embodiment, this is achieved by an end region of the actuating element being hingedly connected to a crank which can be rotated by 180° between two dead centers. If the crank is in one dead center, the actuating element occupies a position in which the braking device is in the braking position. If the crank is in the other dead center, the actuating element occupies a position in which the braking device is in the opened position. The two dead centers determine the two end points which determine the longitudinal movement of the actuating element. The brake is therefore always actively actuated and also in turn actively released. It functions similarly to a parking brake of a car, which is also actively actuated when stopping and actively rereleased before driving forwards out of a stop.

The crank can be driven in particular by a motor.

The crank defines, by means of the dead centers thereof, two characteristic points of the braking device, between which points the braking device can be switched back and forth by means of the crank. The braking device therefore has defined end states and there is no danger of the braking device remaining in an intermediate state which corresponds neither to the braking position nor to the opened position.

The braking device can have a movable limb; the braking device preferably has two limbs.

The actuating element is in particular a crank rod. This crank rod can be hingedly connected to a pressure lever, one end of which is directly articulated to a limb having a brake end, and the other end of which is indirectly connected to a second limb having a brake end by means of a transmission lever.

The transition of the crank from one dead center into the other dead center can lead to the pressure lever rotating by 90°, and therefore to a transition between the braking position and the opened position as described above.

The braking device preferably comprises a motor, in particular a geared motor. Similarly to a car windscreen wiper, the motor can move the crank back and forth between the dead centers.

The motor can be controlled by at least one limit switch, in particular a microprocessor controller and/or an electric switch. Two limit switches are preferably used which are arranged at the end positions of the crank on either side, or at the two end points which determine the longitudinal movement of the actuating element, or at the dead center positions of the crank on either side. The control system can thus be simple since the motor can easily move between the two predetermined end positions.

In one advantageous embodiment of the braking device, the frame comprises a retaining device by means of which the braking device can be fixed to an elevator car. The frame can be designed as a housing.

The problem is also solved by means of an elevator car comprising at least one braking device as described above.

The problem is also solved by means of an elevator system comprising at least one braking device as described above.

The elevator system preferably comprises at least one elevator car comprising at least one braking device as described above, and at least one guide rail.

The problem is also solved by means of a method for stopping an elevator car at a stopping place. In so doing, a braking device as described above moves from an opened position into a braking position and from the braking position into the opened position by means of a longitudinal movement of an actuating element or of a crank rod.

The problem is also solved by means of a method for stopping an elevator car at a stopping place, in particular as described above, a motor transferring a crank that is connected to the actuating element, in particular the crank rod, from a second dead center into a first dead center. In this case, the braking device is moved from a braking position into an opened position. In the braking position, the crank is in a second dead center and the brake end of at least one brake limb is at a minimum distance from a rail in the elevator shaft. In the opened position, the crank is in a first dead center in which the brake end of at least one brake limb is at a maximum distance from a rail in the elevator shaft. When transferring the crank from the first dead center into the second dead center, the reverse movement from the opened position into the braking position takes place.

Preferred embodiments of the invention shall be described in greater detail in the following description with reference to the accompanying drawings. In this case corresponding elements are denoted by the same reference signs.

DETAILED DESCRIPTION

Figure 1:
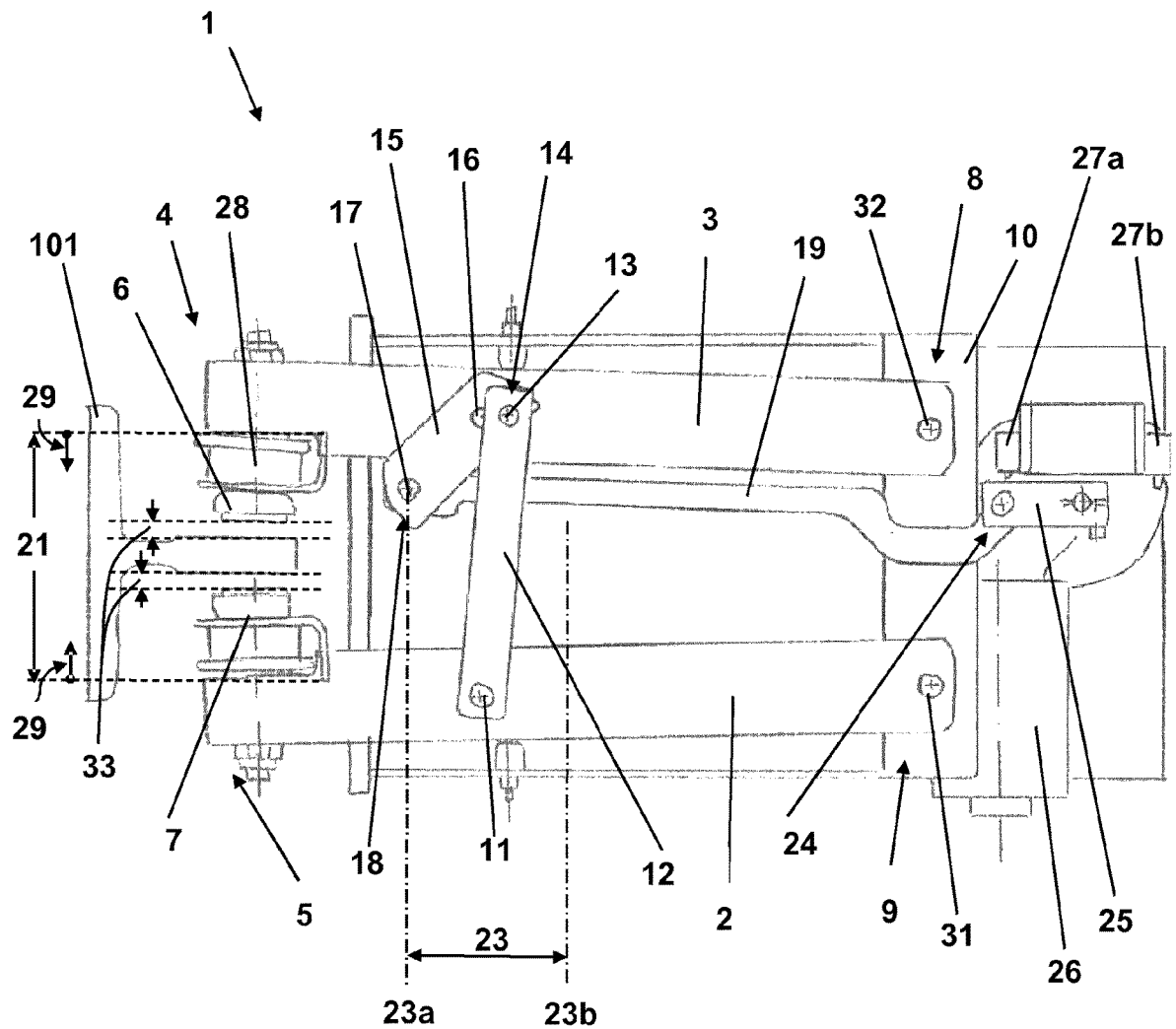
FIG. 1 is a schematic plan view of a first example of a braking device in an opened position.
Figure 2:
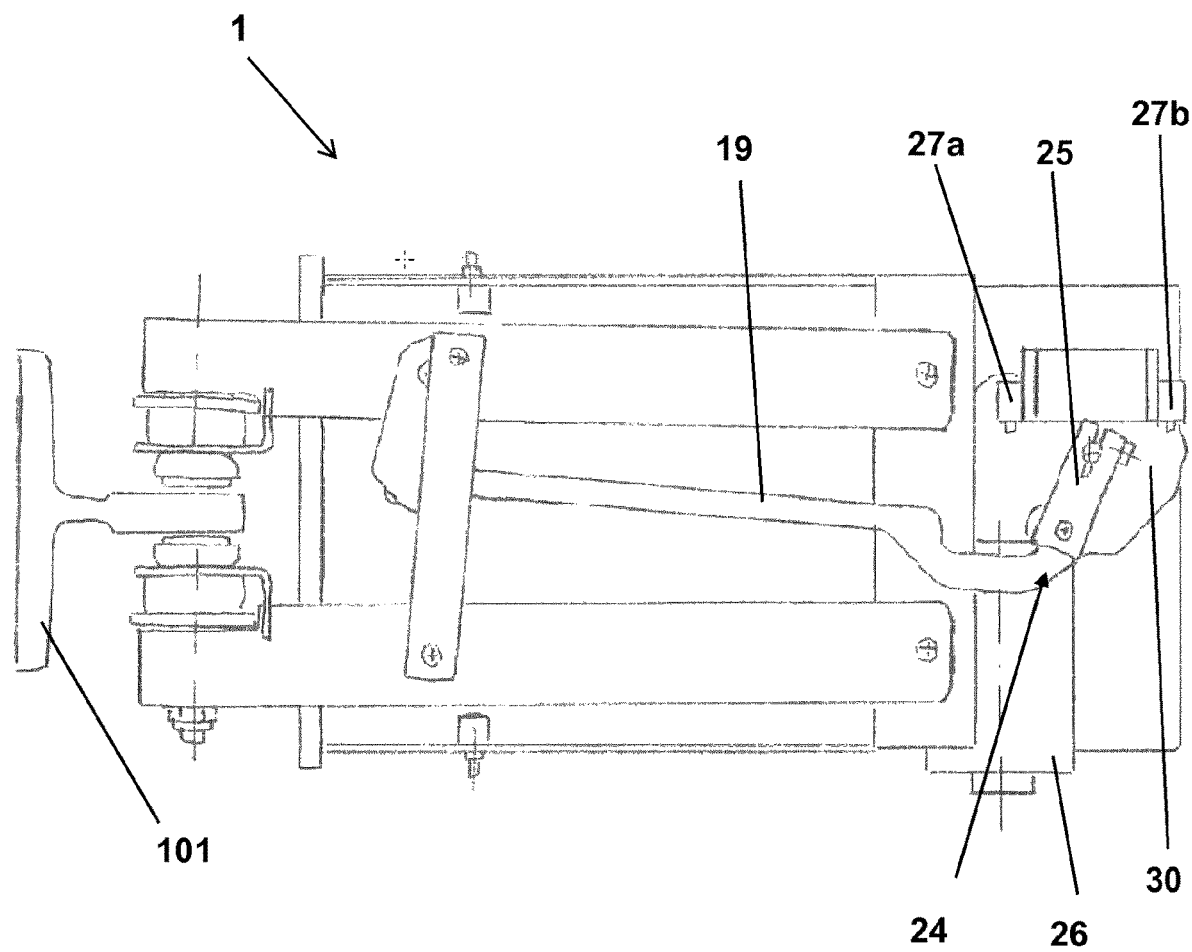
FIG. 2 is a schematic plan view of the first example of a braking device in an intermediate position.
Figure 3:
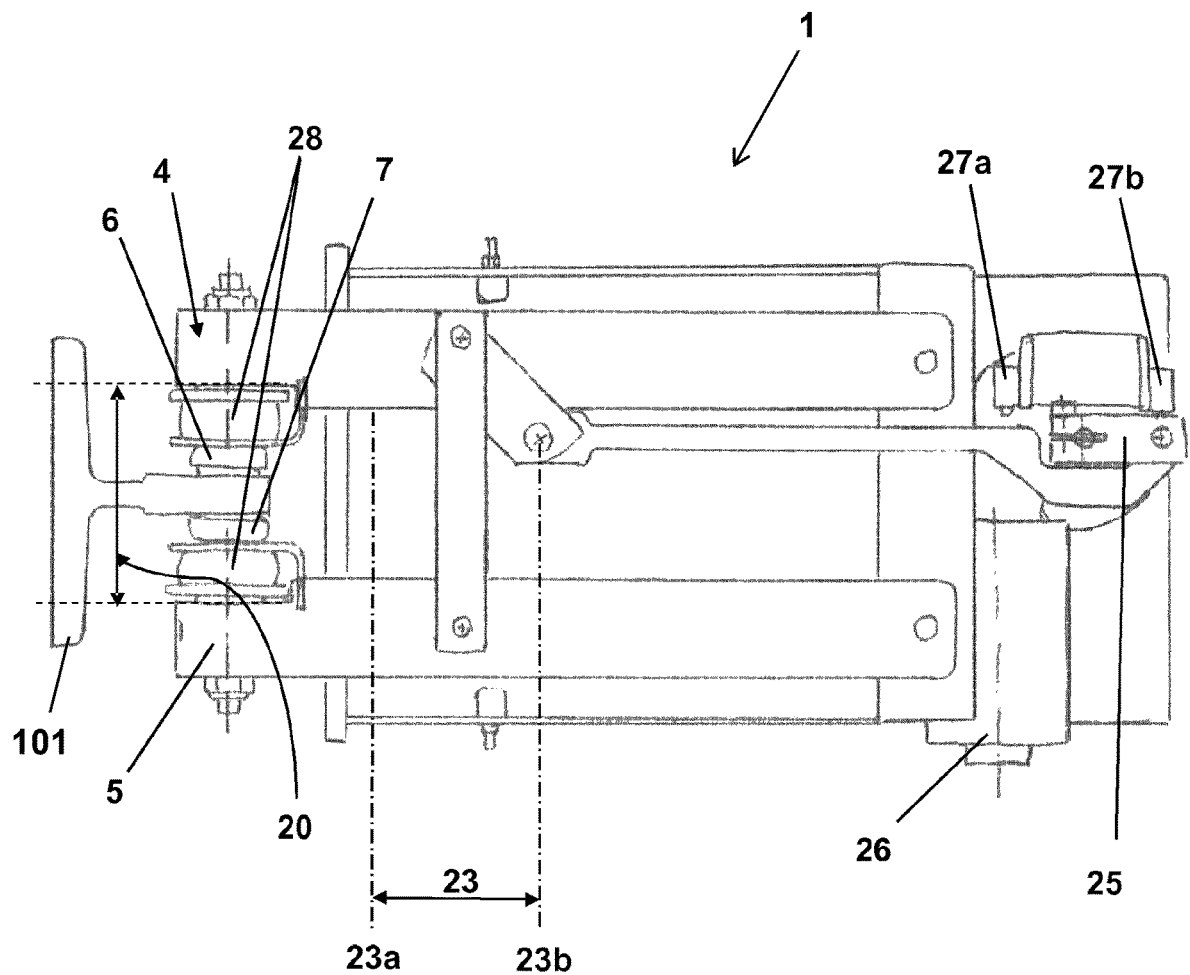
FIG. 3 is a schematic plan view of the first example of a braking device in a braking position.

FIG. 1 is a schematic plan view of a first example of a braking device 1 in an opened position. FIG. 2 shows the same example in an intermediate position and FIG. 3 shows the same example in a braking position. The braking position is shown again in FIG. 4 in a perspective view.

The braking device 1 is used in an elevator system 100 (see FIGS. 6*a* and 6*b*), which is not shown in greater detail here, in order to generate a frictional connection on a rail 101 of the elevator system.

The braking device comprises two limbs 2, 3 which each have a brake end 4, 5.

The first limb 2 is hingedly connected to a first articulation point 11 of a transmission lever 12. The transmission lever 12 has a second articulation point 13 that is spaced apart from the first articulation point 11 in the longitudinal direction and is hingedly connected to a first pivot 14 of a pressure lever 15.

The second limb 3 is hingedly connected to a second pivot 16 of the pressure lever 15.

A third pivot 17 of the pressure lever 15 is hingedly connected to an articulation point 18 of an actuating element 19. In the following, the actuating element 19 is designed as a crank rod 19 and, accordingly, the articulation point 18 of the actuating element is designed as a crank articulation point 18. These parts are functionally analogous and are correspondingly denoted by the same reference signs.

As a result of a longitudinal movement 23 of the crank rod 19, the braking device 1 can be moved from an opened position, in which the brake ends 4, 5 are at a maximum distance 21 from one another, into a braking position, in which the brake ends 4, 5 are at a minimum distance 20 from one another (see FIG. 3). The longitudinal movement is in this case determined by a first end point 23*a* (see FIG. 1) and a second end point 23*b* (see FIG. 3).

The end regions 8, 9 of each limb 2, 3 that are opposite the brake ends 4, 5 are each pivotally connected to a braking device frame 10 by means of bearings 31, 32. The frame 10 can be fastened to an elevator car (not shown).

The crank articulation point 18 of the crank rod 19 is arranged between the limbs 2, 3 such that the crank rod 19 can be moved back and forth substantially between the limbs 2, 3.

The articulation points on the limbs 2, 3, the transmission lever 12 and the pivots 14, 16, 17 of the pressure lever 16 are arranged such that the brake ends 4, 5 each cover a path length 29 of at least 7 mm in total between the braking position and the opened position. The path length 29 is greater than the sum of an air gap 33 on either side. The air gap 33 corresponds to the free passage clearance between the braking surfaces and guide rail when the braking device 1 is open.

The braking device 1 comprises brake pad carriers 6, 7 which are resiliently mounted on the brake ends 4, 5 by means of spring elements 28. When closing the braking device, the spring elements 28 are tensioned such that a corresponding compressive force builds up which causes a corresponding stopping or braking force of the braking device.

An end region 24 of the crank rod 19 that is opposite the crank articulation point 18 is hingedly connected to a crank 25 which can be rotated by 180° between two dead centers. In each of the dead centers, the crank 25 is oriented at least approximately in the longitudinal direction of the crank rod 19, such that the braking device 1 is in the opened position if the crank 25 is in one dead center (see FIG. 1), and the braking device 1 is in the braking position if the crank 25 is in the other dead center (see FIG. 3).

FIG. 2 shows the braking device 1 in an intermediate position in which the crank 25 is not in either of the dead centers.

The crank 25 can be driven by a motor 26.

The motor 26 is provided with a gear system 30 and is controlled by two limit switches 27*a*, 27*b* which define the end positions of the crank 25 on either side and therefore define the two end points 23*a*, 23*b*.

Figure 4:
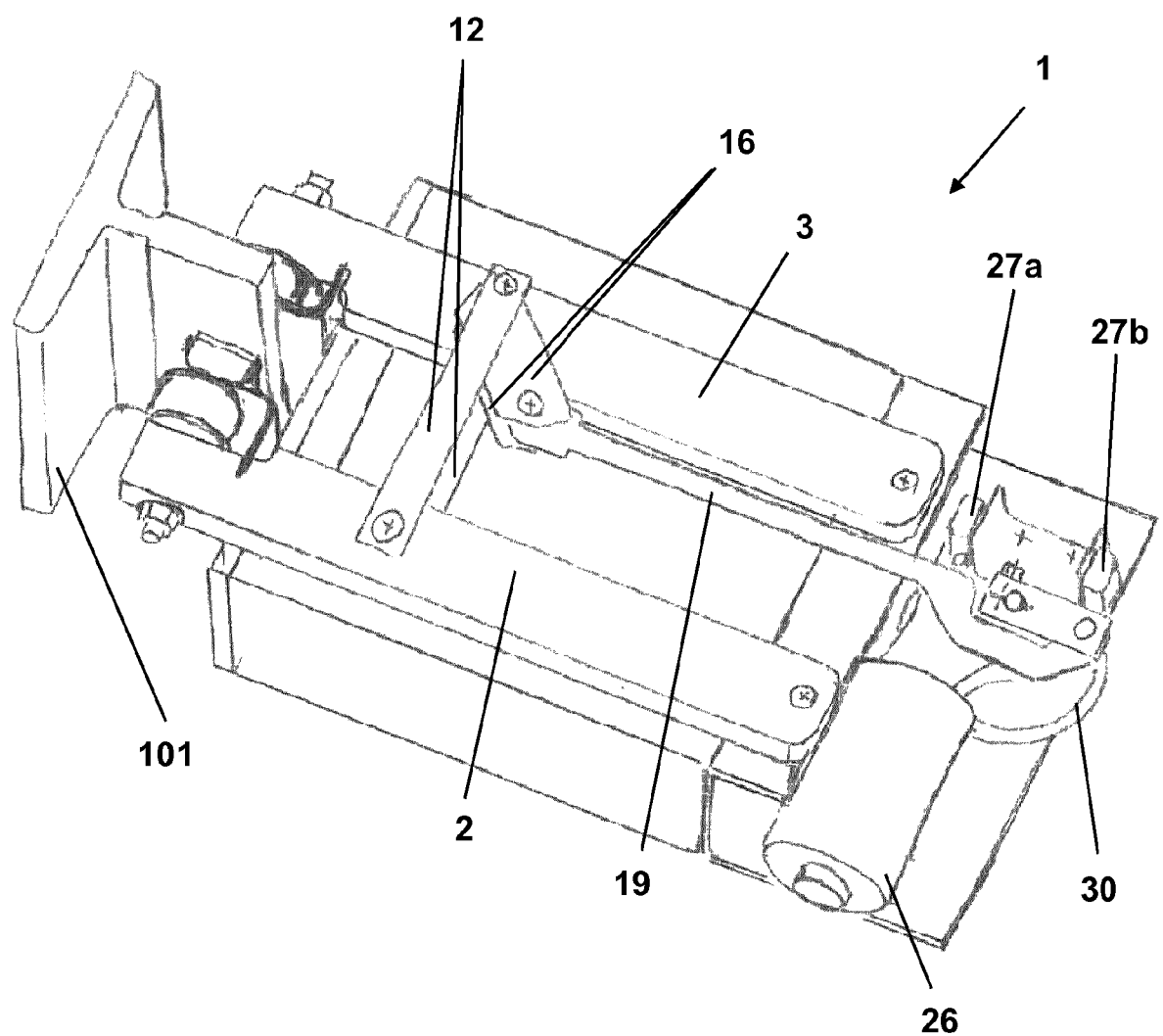
FIG. 4 is a schematic perspective view of the first example of a braking device in the braking position.

It can be seen from FIG. 4 that the braking device 1 has two transmission levers 12 arranged in parallel with one another and two pressure levers 16 arranged in parallel with one another, one transmission lever 12 and one pressure lever 16 of which are in each case provided on one side of the limb 2, 3 and of the crank rod 19 respectively.

Figure 5:
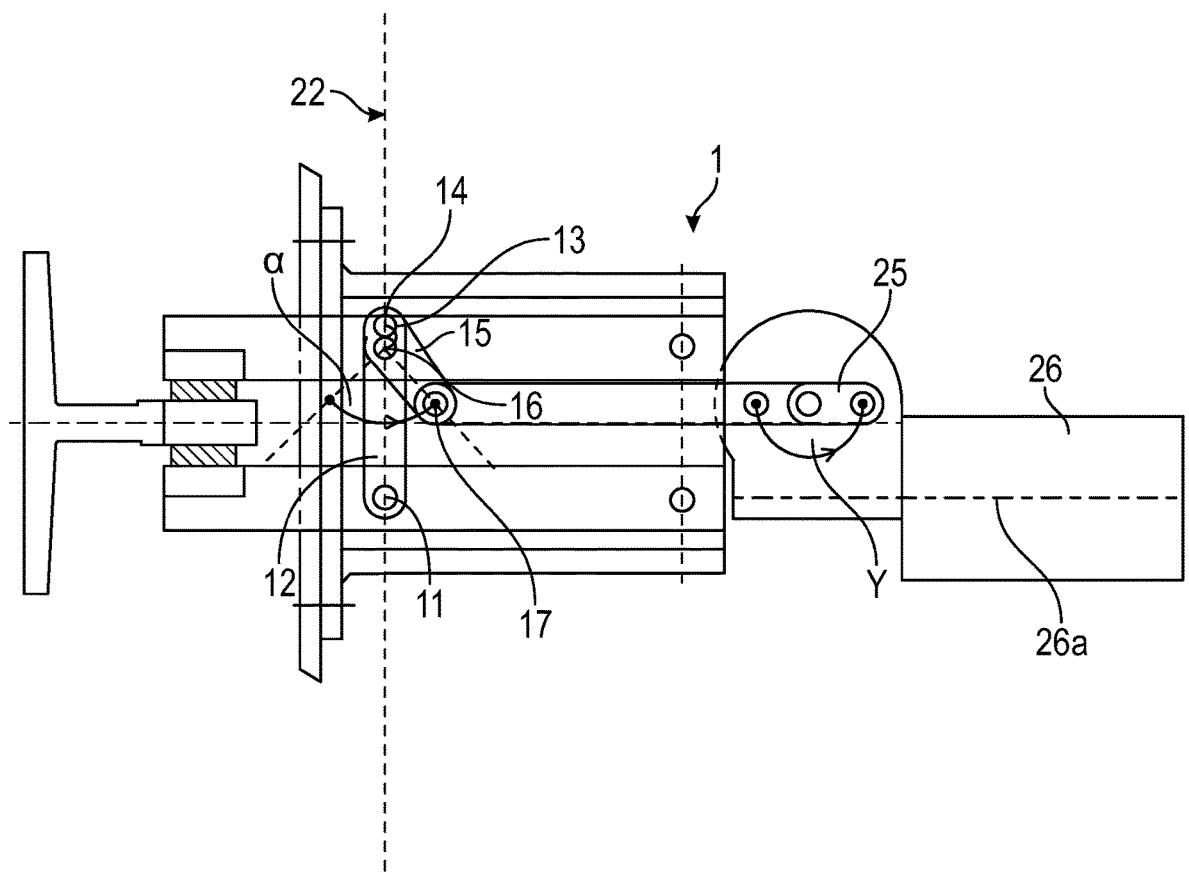
FIG. 5 is a schematic plan view of a second example of a braking device in a braking position.

FIG. 5 is a schematic plan view of a second example of a braking device 1 in a braking position.

The pivots 14, 16, 17 of the pressure lever 15 are arranged such that, in the braking position, the second pivot 16 is on a connecting line 22 between the first and second articulation point 11, 13 of the transmission lever 12 and, in the opened position, the pressure lever 15 is rotated about the second pivot 16 by an angle α of 90° with respect to the braking position. The angle α of 90° can be varied. Said angle is specified by a person skilled in the art in combination with the lever ratios.

To rotate the pressure lever 15, the crank 25 rotates by an angle γ of 180° from one dead center into the other.

Moreover, in the embodiment according to FIG. 5, a motor axis 26a of the motor 26 is arranged in a direction of extension of the braking device 1. By comparison with the embodiment according to FIGS. 1 to 4, this produces a thinner brake which requires less space in the lateral direction.

Figure 6A:
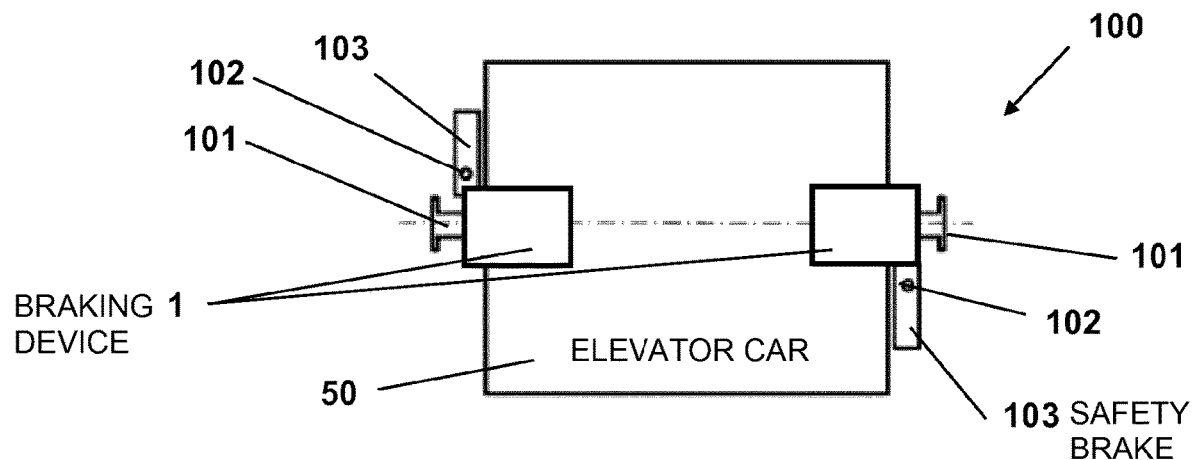
FIG. 6*a* is a schematic plan view of an example of an elevator system with two of the braking devices.
Figure 6B:
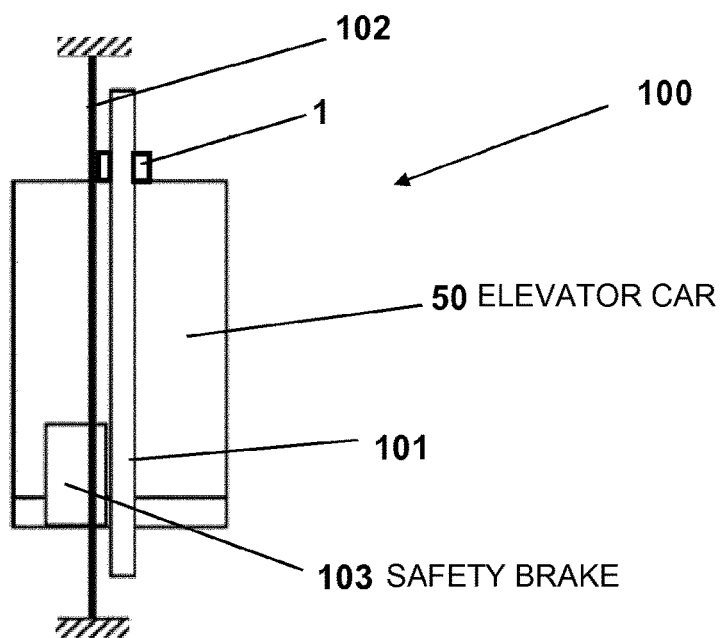
FIG. 6*b* is a schematic side view of the elevator system from FIG. 6*a*.

FIG. 6a is a schematic plan view of an example of an elevator system 100, and FIG. 6b is a side view of the same example. The elevator system 100 comprises an elevator car 50. Two safety brakes 103 are attached to said car, which brakes can each interact with a cable 102 in this example. This embodiment is exemplary. The safety brakes 103 can self-evidently be designed as conventional known safety catches which interact with T-shaped guide rails, as shown in FIGS. 1 to 5.

Two braking devices 1 are additionally attached to the elevator car 50, which braking devices can cause a frictional connection to a guide rail 101. The braking devices 1 do not automatically close if, for example, a certain speed is exceeded. They are used for comfort at a stopping place.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A braking device for an elevator system for generating a frictional connection on a rail of the elevator system and for stopping an elevator car in a stopping place, the braking device comprising:
    two limbs each having a brake end;
    a first limb of the limbs being hingedly connected to a first articulation point of a transmission lever that has a second articulation point spaced apart from the first articulation point in a longitudinal direction of the transmission lever, the second articulation point being hingedly connected to a first pivot of a pressure lever;
    a second limb of the limbs being hingedly connected to a second pivot of the pressure lever;
    a third pivot of the pressure lever being hingedly connected to an articulation point of an actuating element wherein, as a result of a longitudinal movement of the actuating element, the braking device is moved between a braking position, in which the brake ends are at a predetermined minimum distance from one another, and an opened position, in which the brake ends are at a predetermined maximum distance from one another;
    wherein the longitudinal movement of the actuating element is predetermined by a first end point and a second end point; and
    wherein an end region of the actuating element is hingedly connected to a crank that can be rotated by 180° between two dead centers, the two dead centers determining the first end point and the second end point of the longitudinal movement of the actuating element.

2. The braking device according to claim 1 wherein an end region of each of the first and second limbs opposite the brake ends is hingedly connected to a braking device frame.

3. The braking device according to claim 1 wherein the first, second and third pivots of the pressure lever are arranged whereby, in the braking position, the second pivot is on a connecting line between the first articulation point and the second articulation point of the transmission lever.

4. The braking device according to claim 1 including a brake pad carriers resiliently mounted on each of the brake ends.

5. The braking device according to claim 4 wherein the brake pad carriers are resiliently mounted by preloaded spring elements.

6. The braking device according to claim 1 including two of the transmission lever, the two transmission levers being arranged in parallel with one another, and two of the pressure lever, the two pressure levers being arranged in parallel with one another, wherein one of the transmission levers and one of the pressure levers are provided on one side of the first and second limbs and the actuating element and another of the transmission levers and another of the pressure levers are provided on an opposite side of the first and second limbs and the actuating element.

7. The braking device according to claim 1 wherein the actuating element is arranged between the first and second limbs.

8. The braking device according to claim 1 including a motor that rotates the crank to drive the longitudinal movement of the actuating element.

9. The braking device according to claim 1 including a motor that drives the longitudinal movement of the actuating element.

10. The braking device according to claim 9 wherein the motor is a geared motor.

11. The braking device according to claim 9 wherein the motor is controlled by at least one limit switch that determines one of the first and second end points.

12. The braking device according to claim 9 wherein the motor is controlled by a first limit switch that determines the first end point and a second limit switch that determines the second end point.

13. The braking device according to claim 1 wherein the first and second limbs are hingedly connected to a frame adapted for fixing the braking device to the elevator car.

14. An elevator car comprising at least one the braking device according to claim 1 fixed thereto.

15. An elevator system comprising:
    a rail;
    an elevator car; and
    at least one of the braking device according to claim 1 fixed to the elevator car for generating a frictional connection on the rail.

16. A method for stopping an elevator car in a stopping place, the method comprising the steps of:
    positioning the elevator car at the stopping place along a rail, the elevator car having at least one of the braking device according to claim 1 fixed thereto; and
    moving the at least one braking device from the opened position into the braking position by longitudinal movement of the actuating element to generate a frictional connection between the at least one braking device and the rail.

17. The method according to claim 16 further comprising:
driving a crank connected to the actuating element with a motor between a first dead center and a second dead center;
wherein the at least one braking device is in the braking position when the crank is at the second dead center and the brake end of at least one of the first and second brake limbs is at the predetermined minimum distance from the rail; and
wherein the at least one braking device is in the opened position when the crank is at the first dead center and the brake end of the at least one of the first and second brake limbs is at the predetermined maximum distance from the rail.

\* \* \* \* \*